United States Patent [19]
Martin et al.

[11] Patent Number: 6,095,941
[45] Date of Patent: Aug. 1, 2000

[54] OVERRUNNING CLUTCH ASSEMBLY

[75] Inventors: Berthold Martin, Shelby Township; John C. Collins, Lake Orion; Charles K. Streetman, Sterling Heights, all of Mich.

[73] Assignee: DaimlerChrysler Corporation, Auburn Hills, Mich.

[21] Appl. No.: 09/282,988

[22] Filed: Mar. 31, 1999

[51] Int. Cl.$^7$ ..................................................... F16H 3/62
[52] U.S. Cl. ............................................. 475/318; 192/45
[58] Field of Search .................................. 192/45, 48.92; 475/318

[56] References Cited

U.S. PATENT DOCUMENTS

| | | | |
|---|---|---|---|
| 2,079,527 | 5/1937 | Rauen | 192/45 |
| 3,012,645 | 12/1961 | Gensheimer et al. | 192/45 |
| 3,448,636 | 6/1969 | Roper et al. | 192/45 |
| 3,732,957 | 5/1973 | McEwen | 192/45 |
| 3,820,640 | 6/1974 | Marola et al. | 192/45 |
| 3,831,464 | 8/1974 | Zaiser | 475/281 |
| 3,977,272 | 8/1976 | Neumann | 475/281 |
| 4,757,887 | 7/1988 | Ostrander et al. | 192/45 |
| 4,848,177 | 7/1989 | Miura et al. | 192/45 |
| 4,867,260 | 9/1989 | Cameron et al. | 180/360 |
| 4,875,391 | 10/1989 | Leising et al. | |
| 5,026,337 | 6/1991 | Miura et al. | 475/283 |
| 5,070,978 | 12/1991 | Pires | 192/45.1 |
| 5,115,689 | 5/1992 | Isozumi et al. | 192/45 |
| 5,318,160 | 6/1994 | Oomi et al. | 192/45 |
| 5,383,542 | 1/1995 | Stockton | 192/45.1 |
| 5,511,642 | 4/1996 | Klotz et al. | 192/45 |
| 5,533,945 | 7/1996 | Martin et al. | 475/276 |
| 5,536,220 | 7/1996 | Martin et al. | 475/275 |
| 5,588,929 | 12/1996 | Benford | 475/276 |
| 5,638,931 | 6/1997 | Kerr | 192/45 |
| 5,760,514 | 6/1998 | Taniguchi et al. | 192/45 |
| 5,800,303 | 9/1998 | Benford | 475/276 |
| 5,928,104 | 7/1999 | Kimura et al. | 475/318 |

OTHER PUBLICATIONS

U.S. application No. 09/283,927, Holbrook, filed Apr. 1, 1999.
U.S. application No. 09/282,671, Nassar, filed Mar. 31, 1999.
U.S. application No. 09/283,073, Nogle, filed Mar. 31, 1999.
U.S. application No. 09/283,912, Redinger, filed Apr. 1, 1999.
U.S. application No. 09/282,375, Dourra, filed Mar. 31, 1999.
U.S. application No. 09/281,861, Martin, filed Mar. 31, 1999.
U.S. application No. 09/282,234, Martin, filed Mar. 31, 1999.
U.S. application No. 09/282,376, Nogle, filed Mar. 31,1999.
U.S. application No. 09/282,675, Martin, filed Mar. 31, 1999.
U.S. application No. 09/282,383, Collins, filed Mar. 31, 1999.
U.S. application No. 09/282,991, Martin, filed Mar. 31, 1999.
U.S. application No. 09/282,676, Martin, filed Mar. 31, 1999.

(List continued on next page.)

*Primary Examiner*—Sherry L. Estremsky
*Attorney, Agent, or Firm*—Marc Lorelli

[57] ABSTRACT

An overrunning clutch assembly for an automatic transmission having a plurality of planetary gear sets. The overrunning clutch assembly includes an inner race and an outer race. The outer race radially surround the inner race. The overrunning clutch assembly further includes a plurality of rollers disposed between the inner race and the outer race for permitting relative rotation between the inner race and the outer race in a first direction and limiting relative rotation between the inner race and the outer race in a second direction. The outer race includes a radially extending portion extending radially inward beyond an outer periphery of the inner race. The radially extending portion cooperates with the inner race to react a thrust load generated by the plurality of gear sets.

19 Claims, 5 Drawing Sheets

OTHER PUBLICATIONS

U.S. application No. 09/282,368, Collins, filed Mar. 31, 1999.
U.S. application No. 09/282,987, Nogle, filed Mar. 31, 1999.
U.S. application No. 09/282,918, Collins, filed Mar. 31, 1999.
U.S. application No. 09/283,911, Holbrook, filed Apr. 1, 1999.
U.S. application No. 09/282,670, Redinger, filed Mar. 31, 1999.
U.S. application No. 09/282,791, Redinger, filed Mar. 31, 1999.
U.S. application No. 09/282,990, Botosan, filed Mar. 31, 1999.
U.S. application No. 09/282,669, Botosan, filed Apr. 1, 1999.
U.S. application No. 09/283,899, Holbrook, filed Apr. 1, 1999.
U.S. application No. 09/283,910, Holbrook, filed Apr. 1, 1999.
U.S. application No. 09/283,454, Holbrook, filed Apr. 1, 1999.
U.S. application No. 09/283,567, Danielson, filed Mar. 31, 1999.
U.S. application No. 09/283,885, Toussagnon, filed Apr. 1, 1999.
U.S. application No. 09/295,713, Nassar, filed Apr. 21, 1999.
U.S. application No. 09/295,713, Nassar, filed Apr. 21, 1999.
U.S. application No. 09/296,022, Nassar, filed Apr. 21, 1999.
U.S. application No. 09/251,258, Botosan, filed Feb. 16, 1999.
U.S. application No. 09/210,977, Correa, filed Dec. 14, 1998.
U.S. application No. 09/168,836, Dourra, filed Oct. 8, 1998.
U.S. application No. 09/277,444, Dourra, filed Mar. 26, 1999.
U.S. application No. 09/273,670, Black, filed Mar. 23, 1999.

OVERRUNNING CLUTCH ASSEMBLY

BACKGROUND OF THE INVENTION

1. Technical Field

The present invention generally relates to motor vehicles. More particular, the present invention relates to a overrunning clutch assembly for an automatic transmission of a motor vehicle.

2. Discussion

A conventional automatic transmission includes a hydrodynamic torque converter to transfer engine torque from an engine crankshaft to a rotatable input member of the transmission through fluid-flow forces. The automatic transmission also includes frictional units, typically referred to as clutches, which couple the rotatable input member to one or more members of a planetary gear set. Other frictional units, typically referred to as brakes, hold one or more members of the planetary gear set stationary during the flow of power. Examples of such automatic transmissions are disclosed in commonly assigned U.S. Pat. No. 4,875,391 to Leising et al. and U.S. Pat. No. 5,800,303 to Benford, which are hereby incorporated by reference as if fully set forth herein.

Such transmissions also typically provide for one or more overrunning clutches in order to improve shift quality. Examples of overrunning clutches for automatic transmissions include ratchet type clutches and traction locking clutches such as a roller ramp or sprag clutch. Typically, overrunning clutches generally include an inner race and an outer race. A discussion of such clutches is disclosed in U.S. Pat. No. 5,070,978 to Pires and U.S. Pat. No. 5,511,642 to Klotz et al., which are hereby incorporated by reference as if fully set forth herein. U.S. Pat. No. 5,511,642 discloses an overrunning clutch having an inner race operatively connected to a brake assembly, an outer race operatively connected to a transmission housing, and a structure disposed between the inner race and outer race for allowing the brake assembly to rotate in only one direction. The particular structure disposed between the inner race and the outer race comprises a plurality of rollers.

Conventional planetary gear assemblies incorporate helical gearing. As a result, significant axial loads or thrust loads are generated by the various planetary gear sets during operation of the automatic transmission. These thrust loads are transmitted to the transmission housing through various components. Through prolonged normal use, as well as through certain extreme operating conditions, certain components of conventional transmissions may prematurely fail from the thrust loads. For example, extreme thrust loads may cause the outer race of an overrunning clutch to axially shift relative to the inner race. If this occurs, the rollers between the inner and outer races may fall out of position.

Thus, a need remains in the art for an overrunning clutch assembly capable of reacting thrust loads during prolonged normal use of an automatic transmission, as well as during extreme operating conditions.

SUMMARY OF THE INVENTION

It is a general object of the present invention to provide an improved overrunning clutch assembly for an automatic transmission of a motor vehicle.

It is another object of the present invention to provide an overrunning clutch assembly for an automatic transmission which is not adversely effected by thrust loads imparted by planetary gear sets.

It is a more particular object of the present invention to provide a overrunning clutch assembly for an automatic transmission of a motor vehicle which incorporates an outer race having a radially inward extending portion which cooperates with an inner race to react thrust loads imparted by one or more planetary gear sets.

In one form, the present invention provides an overrunning clutch assembly for an automatic transmission having a plurality of planetary gear sets. The overrunning clutch assembly includes an inner race and an outer race. The outer race radially surround the inner race. The overrunning clutch assembly further includes a plurality of rollers disposed between the inner race and the outer race for permitting relative rotation between the inner race and the outer race in a first direction and limiting relative rotation between the inner race and the outer race in a second direction. The outer race includes a radially extending portion extending radially inward beyond an outer periphery of the inner race. The radially extending portion cooperates with the inner race to react a thrust load generated by the plurality of gear sets.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
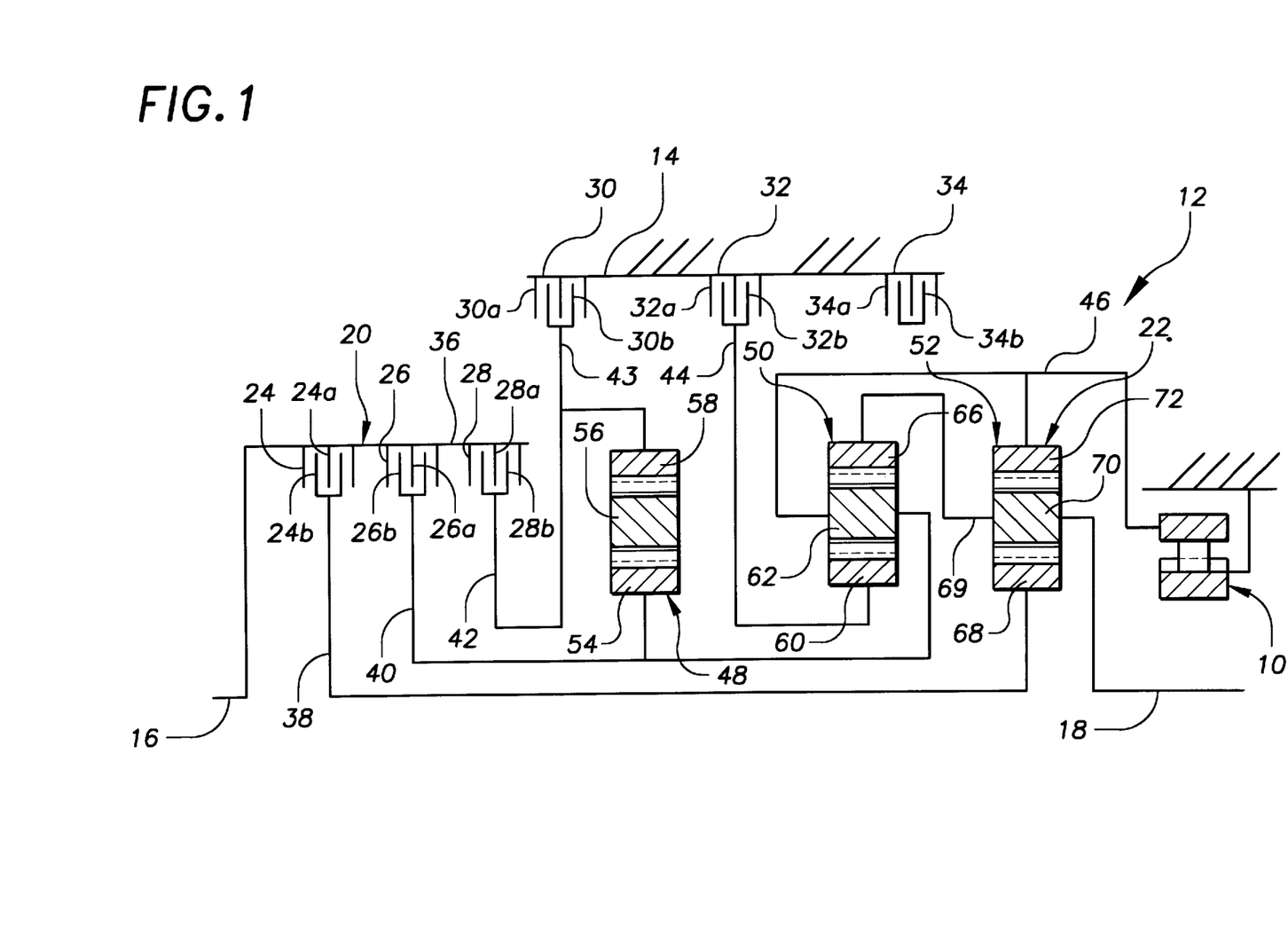
FIG. 1 is a simplified schematic view shown in partial cross-section, illustrating an automatic transmission for a motor vehicle including an overrunning clutch assembly constructed in accordance with the teachings of a preferred embodiment of the present invention.

With initial reference to FIG. 1, an overrunning clutch assembly 10 constructed in accordance with the teachings of a preferred embodiment of the present invention is illustrated. The overrunning clutch assembly 10 is shown in operational relationship to an automatic transmission, generally indicated at 12 and partially shown. The automatic transmission 12 is adapted for use in a vehicle (not shown) such as an automotive vehicle. The particular automatic transmission 12 illustrated will be understood to be exemplary in nature.

The automatic transmission 12 is illustrated to include a transmission housing 14, an input member 16, an output member 18, a multi-clutch and brake assembly, generally indicated at 20, and a gear assembly generally indicated at 22. The transmission housing 14 is stationary relative to the rotatable input member 16, the output member 18 and gear assembly 22. The multi-clutch and brake assembly 20 allows predetermined gears within the gear assembly 22 to be selectively engaged and disengaged from either the input member 16 or the transmission housing 14. Near the input side of the transmission 12, the multi-clutch and brake assembly 20 includes an underdrive clutch assembly 24 (applied in first, second and third gears), an overdrive clutch assembly 26 (applied in third and fourth gears) and a reverse clutch assembly 28 (applied in reverse gear). Near the output side of the transmission 12, the multi-clutch and brake assembly 20 includes a first brake assembly 30 (applied in fourth gear), a second brake assembly 32 (applied in second gear) and a low-reverse brake assembly 34 (applied in first and reverse gears).

The underdrive clutch assembly 24 includes a plurality of axially spaced annular plates 24a and a plurality of axially spaced annular discs 24b which are alternated between the plates 24a. When the underdrive clutch assembly 24 is not applied, these plates 24a and discs 24b are free to move or rotate relative to each other. The plates 24a are mounted to an input retainer 36 operatively connected to the input member 16. The discs 24b are mounted to an underdrive hub 38 operatively connected to the gear assembly 22.

The overdrive clutch assembly 26 includes a plurality of axially spaced annular plates 26a and a plurality of axially spaced annular discs 26b. The plates 26a and discs 26b are similar to those of the underdrive clutch assembly 24. The plates 26a are mounted to the input retainer 36 and the discs 26b are mounted to an overdrive hub 40 operatively connected to the gear assembly 22.

The reverse clutch assembly 28 includes a plurality of axially spaced annular plates 28a and a plurality of axially spaced annular discs 28b. The plates 28a and discs 28b are similar to those of the underdrive clutch assembly 24. The plates 28a are mounted to the input retainer 36 and the discs 28b are mounted to a reverse hub 42 operatively connected to the gear assembly 22. It should be appreciated that the clutch assemblies 24, 26 and 28 are applied by fluid actuating devices (not shown).

The first brake assembly 30 includes a plurality of axially spaced annular plates 30a and a plurality of axially spaced annular discs 30b. The plates 30a and discs 30b are similar to those of the underdrive clutch assembly 24. The plates 30a are mounted to the transmission housing 14 and the discs 30b are mounted to a first hub 43 connected to the reverse hub 42.

The second brake assembly 32 includes a plurality of axially spaced annular plates 32a and a plurality of axially spaced annular discs 32b. The plates 32a and discs 32b are similar to those of the underdrive clutch assembly 24. The plates 32a are mounted to the transmission housing 14 and the discs 32b are mounted to a second hub 44 operatively connected to the gear assembly 22.

Figure 2:
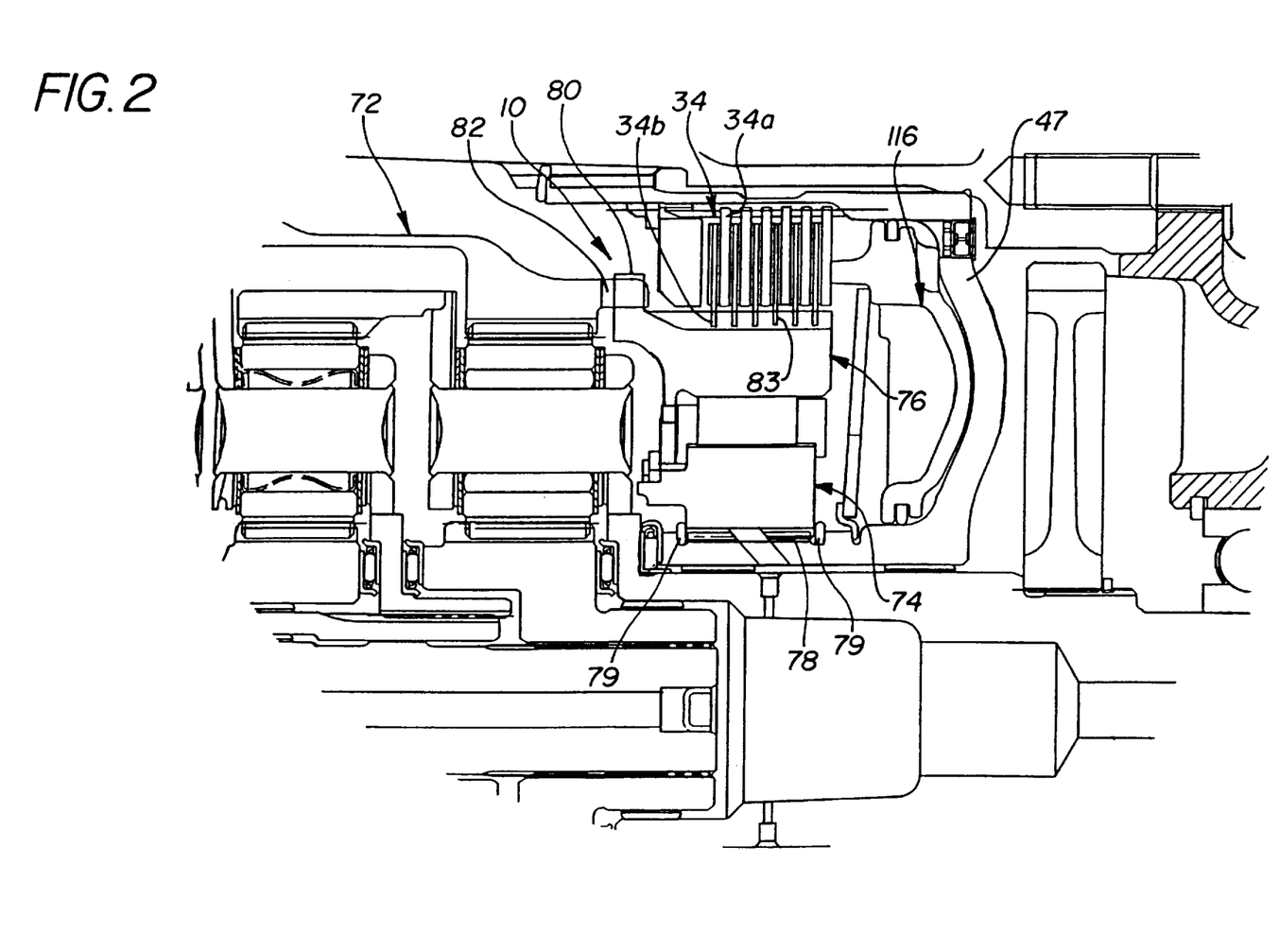
FIG. 2 is an enlarged cross-sectional view of a portion of the automatic transmission of FIG. 1.
Figure 3:
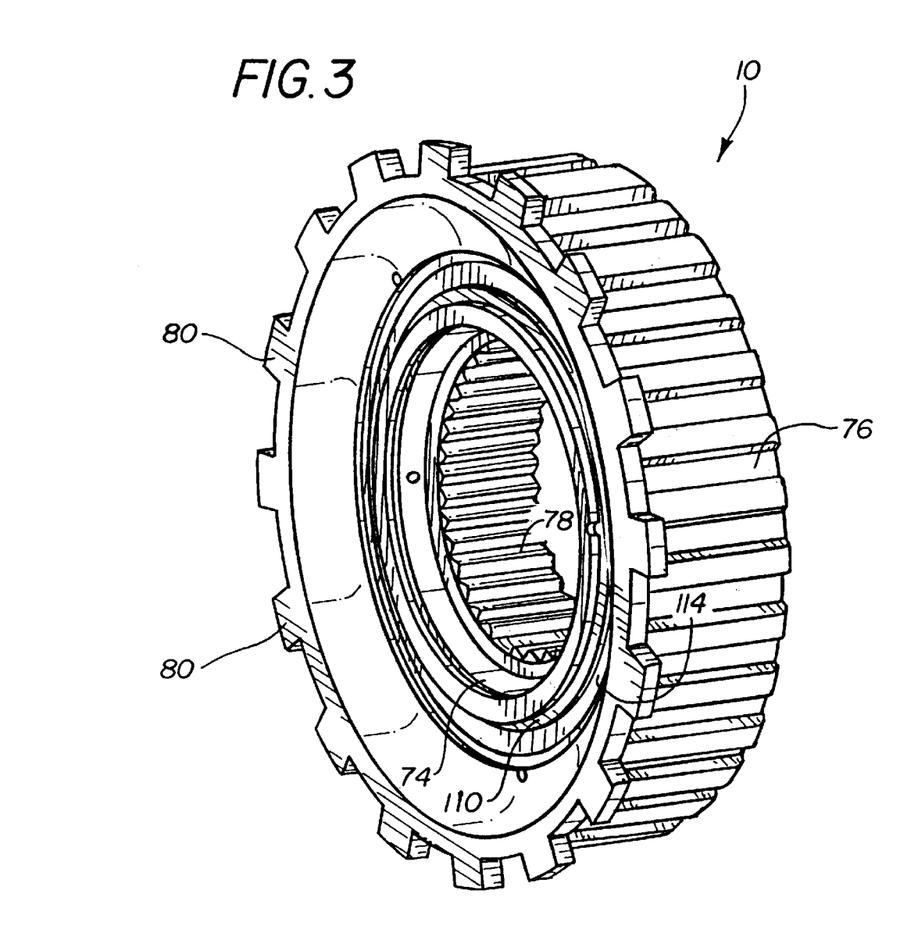
FIG. 3 is a perspective view of the overrunning clutch assembly of the preferred embodiment of the present invention removed from the transmission for purposes of illustration.
Figure 4:
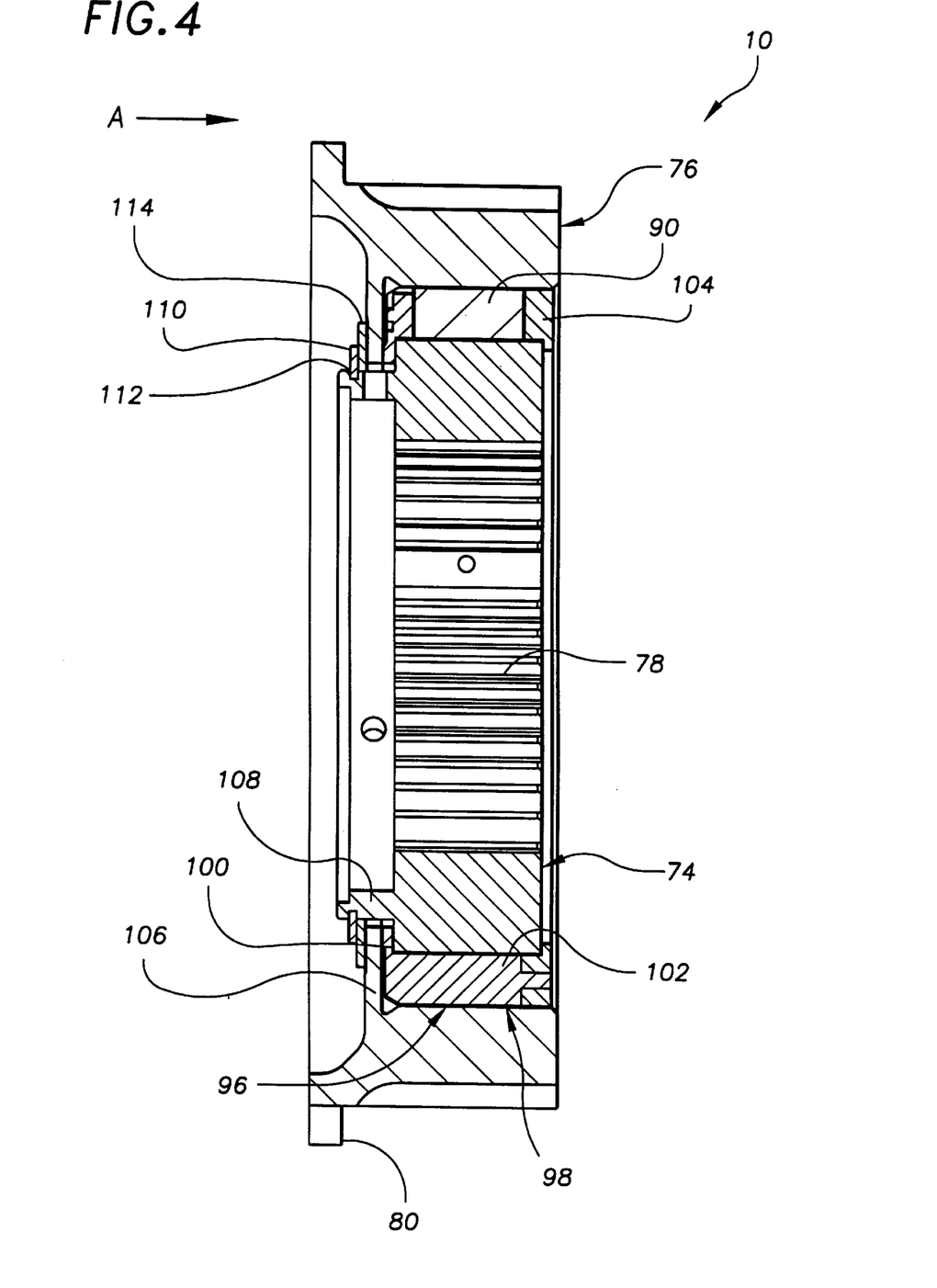
FIG. 4 is a cross-sectional view of the overrunning clutch assembly of the preferred embodiment of the present invention.

The low/reverse brake assembly 34 includes a plurality of axially spaced annular plates 34a and a plurality of axially spaced annular discs 34b. The plates 34a and discs 34b are similar to those of the underdrive clutch assembly 24. The plates 34a are mounted to the transmission housing 14 through a retainer 47 (shown in FIG. 2). The retainer 47 is in turn splined to the transmission housing 14. The discs 34b are mounted to the overrunning clutch assembly 10 in a manner to be described further herein. It should be appreciated that the brake assemblies 30, 32 and 34 are applied by fluid actuating devices (not shown).

The gear assembly 22 includes a front or first planetary gear set, generally indicated at 48, an axially spaced intermediate or second planetary gear set, generally indicated at 50, and an axially spaced rear or third planetary gear set, generally indicated at 52. The first planetary gear set 48 includes a first sun gear 54 at its center. The first sun gear 54 is connected to the overdrive hub 40. The first planetary gear set 48 also includes a first planetary carrier 56 having a plurality of circumferentially spaced first pinion gears to engage the first sun gear 54. The first planetary carrier 56 is connected to the second hub 44 of the second brake assembly 32. The first planetary gear set 48 further includes a first annulus gear 58 disposed about thus first planetary carrier 56 and which engages the first pinion gears. The first annulus gear 58 is connected to the first hub 43 of the first brake assembly 30.

The intermediate or second planetary gear set 50 includes a second sun gear 60 at its center which is connected to the second hub 44 of the second brake assembly 32. The second planetary gear set 50 also includes a second planetary carrier 62 having a plurality of circumferentially spaced second pinion gears to engage the second sun gear 60. The second planetary carrier 62 is connected to the first connecting member 46 and to the first sun gear 54 and overdrive clutch hub 40. The second planetary gear set 50 further includes a second annulus gear 66 disposed about the second planetary carrier 62 which engages the second pinion gears. The second annulus gear 66 is connected to the third planetary gear set 52 to be described.

The rear or third planetary gear set 52 includes a third sun gear 68 at its center which in connected to the underdrive hub 38. The third planetary gear set 52 also includes a third planetary carrier 70 having a plurality of circumferentially spaced third pinion gears to engage the third sun gear 68. The third planetary carrier 70 includes a connecting member 69 connected to the second annulus gear 66. The third planetary carrier 70 is also connected to the output member 18 of the transmission 12. The third planetary gear set 52 further includes a third annulus gear 72 disposed about the third planetary carrier 70. The third planetary carrier 70 engages the third pinion gears.

With continued reference to FIG. 1 and additional reference to FIGS. 2 through 6, the overrunning clutch assembly 10 is illustrated to generally include an inner race 74 and an outer race 76. The inner race 74 is annular and extends axially. The inner race 74 is grounded to the housing 14 by being splined at 78 to the retainer 47. A pair of snap rings 79 prevent axial shifting of the inner race 74 relative to the retainer 47.

The outer race 76 is disposed about and spaced radially from the inner race 74. The outer race 76 is annular and extends axially. The outer race 76 includes a plurality of radially outward extending teeth 80 which are meshingly engaged with axially rearward extending teeth 82 of the third annulus 72. The axially spaced annular discs 34b of the low/reverse brake assembly 34 are splined to an outer surface of the outer race 76 at 83.

Figure 6:
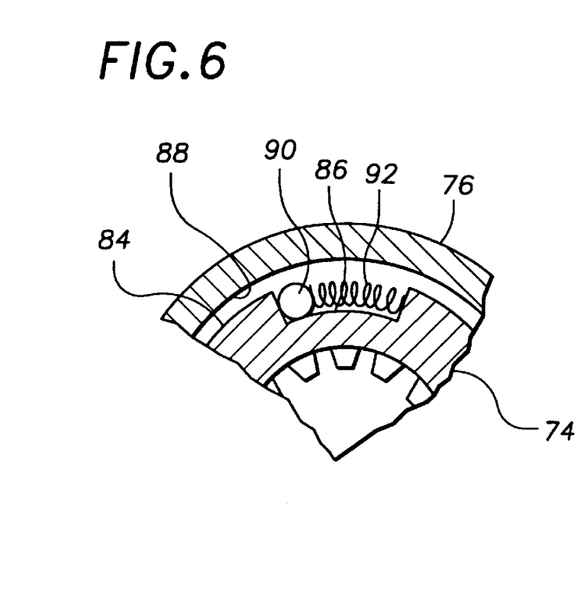
FIG. 6 is a fragmentary cross-sectional view further illustrating a portion of the overrunning clutch assembly of the preferred embodiment of the present invention.

With particular reference to the fragmentary cross-sectional view of FIG. 6, the inner race 74 is shown to include an outer periphery or surface 84 with a plurality of circumferentially spaced ramps 86. The ramps 86 extend circumferentially and radially outward from the outer surface 84 to an inner periphery or surface 88 of the outer race 76 for a function to be described. A related arrangement of ramps is shown and described in further detail in commonly assigned U.S. Pat. No. 5,511,642, which is hereby incorporated by reference as if fully set forth herein.

Figure 5:
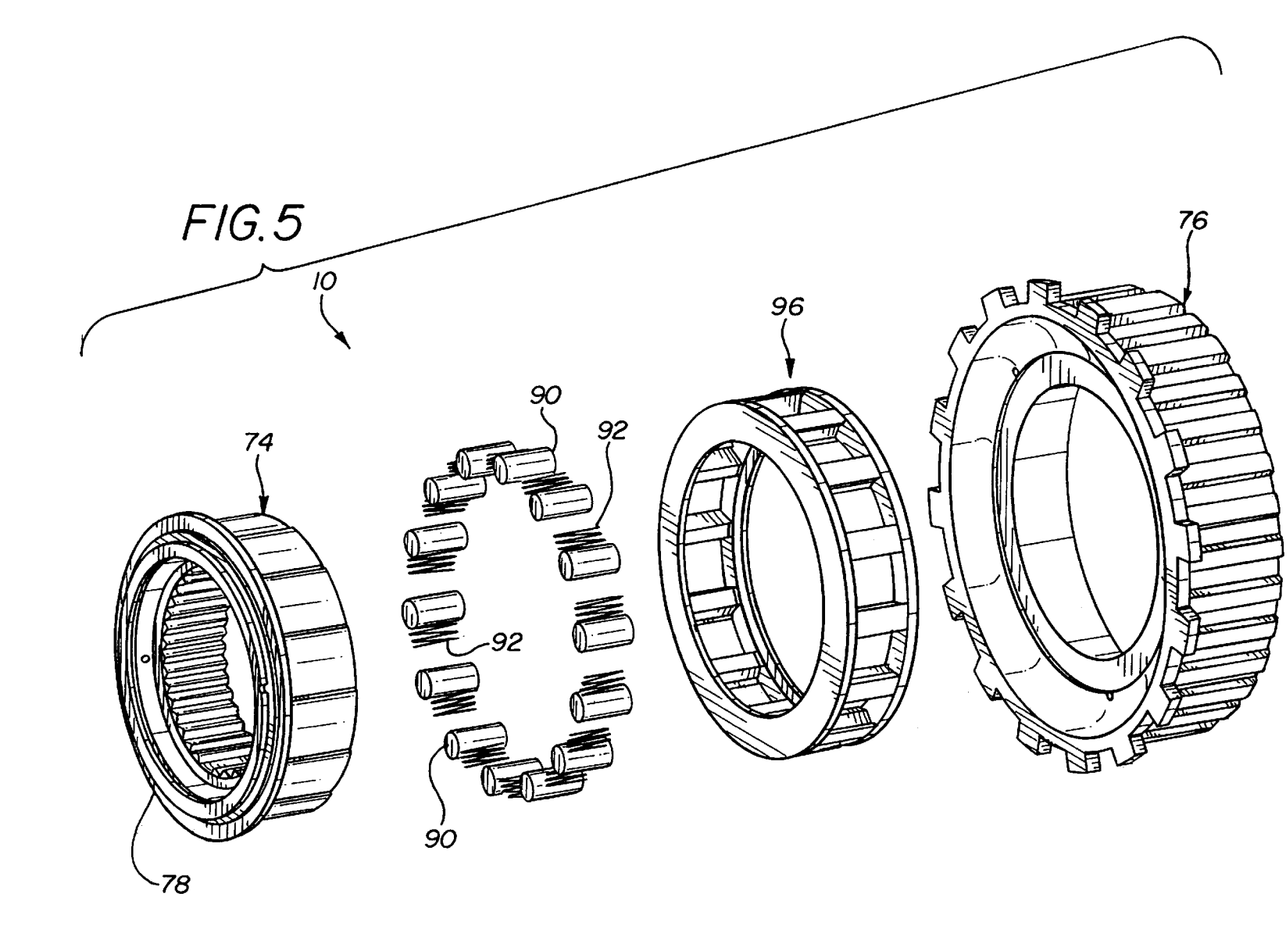
FIG. 5 is an exploded perspective view of the overrunning clutch assembly of the preferred embodiment of the present invention.

As shown in FIGS. 5 and 6, the overrunning clutch assembly 10 further includes a plurality of rollers 90 disposed between the inner race 74 and outer race 76. The rollers 90 are generally cylindrical in shape and extend axially. Preferably, one roller 90 is disposed along each ramp 86 of the inner race 74. A spring 92 is associated with each of the rollers 90 to bias the rollers 90 to one end of their associated ramp 86. The outer race 76 normally rotates counterclockwise (as shown in FIG. 6) with the third annulus gear 72 because the rollers 90 are disposed at one end of the ramps 86 (i.e., the deeper end). The overrunning clutch assembly 10 functions to restrict the axially spaced annular discs 34b of the low/reverse brake assembly 34 from rotating clockwise because of the engagement of the rollers 90 with the inner race 74 and outer race 76 at the other end of the ramp 86.

The overrunning clutch assembly 10 is illustrated to also include a retainer 96 for axially retaining the rollers 90 between the inner race 74 and outer race 76. The retainer 96 includes a first portion 98 having a first radially oriented rim 100 and a plurality of axially extending tangs 102. The retainer 96 further includes a second portion which defines a second radially oriented rim 104 fixedly secured to the tangs 102. The rollers 90 are axially captured between the rims 100 and 104 and permitted to translate along the ramps 86 between adjacent ones of the tangs 102.

To provide means for reacting thrust loads generated by the planetary gear sets 48, 50 and 52 in a direction indicated by arrow A (identified in FIG. 4), the outer race 76 is illustrated to include an inwardly extending radial flange 106. In the exemplary embodiment, the inner race 76 includes an axially extending, continuous lip 108. The axially extending lip 108 is radially disposed slightly inward from the periphery of the inner race 74 resulting in a stepped portion. The radial flange 106 of the outer race 76 inwardly extends past the rollers 90 and the stepped portion of the inner race 74 and terminates adjacent the lip 108. The radial flange 106 is axially captured relative to the inner race 74 on one side by the stepped portion of the inner race 74 and on the other side by snap rings 110. The snap ring 110 is disposed within a radially extending groove 112 formed in a distal portion of the lip 108. A thrust plate 114 is disposed between the snap ring 110 and the radial flange 106.

The overrunning clutch assembly 10 functions to arrest rotation of the annulus gear 72 prior to shifting of the transmission 12 into first gear by coupling the annulus gear 72 to the relatively stationary transmission housing 14. A hydraulic piston disposed within the retainer 47 conventionally functions to force the plates 34a and discs 34b of the reverse clutch assembly 34 together to thereby produce a frictional force between them. Because the plates 34b do not rotate or are stationary, as they are interconnected to the transmission housing 14, the frictional force holds the discs 34b stationary, in turn, holding the outer race 76 and annulus gear 72 stationary.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An overrunning clutch assembly for an automatic transmission having a plurality of planetary gear sets, the overrunning clutch assembly comprising:
    an inner race;
    an outer race radially surrounding said inner race; and
    means disposed between said inner race and said outer race for permitting relative rotation between said inner race and said outer race in a first direction and limiting relative rotation between said inner race and said outer race in a second direction;
    said outer race including a radially extending portion extending radially inward beyond an outer periphery of said inner race;
    said radially extending portion comprising a radially extending flange, said inner race including an axially extending portion axially extending beyond said radially extending flange.

2. The overrunning clutch assembly for an automatic transmission of claim 1, wherein said means disposed between said inner race and said outer race comprises a plurality of axially extending rollers.

3. The overrunning clutch assembly for an automatic transmission of claim 1, wherein said axially extending portion comprises a continuous lip.

4. The overrunning clutch assembly for an automatic transmission of claim 3, further comprising a first snap ring disposed within a radially extending groove defined in a distal portion of said axially extending portion.

5. The overrunning clutch assembly for an automatic transmission of claim 4, further comprising a second snap ring disposed between said first snap ring and said radially extending flange.

6. An overrunning clutch assembly in combination with an automatic transmission including a transmission housing, an input member, an output member, a planetary gear set for changing a ratio of torque between the input member and the output member, and a brake assembly for selectively coupling a rotatable component of said planetary gear set to the transmission housing, said overrunning clutch assembly comprising:
    an inner race operatively coupled to said transmission housing;
    an outer race operatively coupled to the brake assembly and operatively coupled to the rotatable component of the planetary gear set; and
    a plurality of rollers disposed between said inner race and said outer race for allowing the rotatable component to rotate in only one direction;
    said outer race including a radially extending portion extending radially inward beyond an outer periphery of said inner race, said radially extending portion cooperating with said inner race to react a thrust load generated by the planetary gear set;
    said radially extending portion comprising a radially extending flange, said inner race including an axially extending portion axially extending beyond said radially extending flange.

7. The overrunning clutch assembly of claim 6, wherein said axially extending portion comprises a continuous lip.

8. The overrunning clutch assembly of claim 6, further comprising a snap ring disposed within a radially extending groove defined in a distal portion of said axially extending portion.

9. The overrunning clutch assembly of claim 8, further comprising a thrust plate disposed between said first snap ring and said radially extending flange.

10. An automatic transmission for a motor vehicle, the automatic transmission comprising:

a transmission housing;

an input member;

an output member;

a planetary gear set for changing a ratio of torque between the input member and the output member, said planetary gear set including a sun gear, a planetary carrier having a plurality of pinion gears meshingly engaged with said sun gear and an annulus gear in meshing engagement with said plurality of pinion gears;

a brake assembly for selectively coupling said annulus gear of said planetary gear set to said transmission housing; and an overrunning clutch assembly including:

an inner race operatively coupled to said transmission housing;

an outer race operatively coupled to the brake assembly and operatively coupled to said annulus gear of the planetary gear set, said outer race including a plurality of radially outward extending teeth meshingaly engaged with a plurality of axially extending teeth of said annulus gear; and a plurality of rollers disposed between said inner race and said outer race for allowing said annulus gear to rotate in only one direction;

said outer race including a radially extending portion extending radially inward beyond an outer periphery of said inner race, said radially extending portion cooperating with said inner race to react a thrust load generated by said planetary gear set.

11. The automatic transmission of a motor vehicle of claim 10, wherein said brake assembly includes a plurality of axially spaced annular plates interleaved with a plurality of axially spaced annular discs, said annular plates nonrotatably interconnected to said transmission housing, said annular discs splined to an outer periphery of said outer race.

12. The automatic transmission of a motor vehicle of claim 10, wherein said radially extending portion of said outer race comprises a radially extending flange.

13. The automatic transmission of a motor vehicle of claim 10, wherein said inner race includes an axially extending portion axially extending beyond said radially extending flange portion.

14. The automatic transmission of a motor vehicle of claim 13, wherein said axially extending portion comprises a continuous lip.

15. The automatic transmission of a motor vehicle of claim 13, wherein said overrunning clutch assembly further includes a snap ring and a thrust plate, said snap ring disposed within a radially extending groove defined in a distal portion of said axially extending portion, said thrust plate disposed between said snap ring and said radially extending flange portion.

16. An overrunning clutch assembly comprising:

an inner race;

an outer race cocentrically arranged with said inner race; and a plurality of rollers disposed between said inner race and said outer race for allowing free relative rotation between said inner race and said outer race in only one direction;

said outer race including a flange radially extending inward beyond an outer periphery of said inner race;

said inner race including an axially extending portion axially extending beyond said radially extending flange.

17. The overrunning clutch assembly of claim 16, wherein said axially extending portion comprises a continuous lip.

18. The overrunning clutch assembly of claim 16, further comprising a snap ring disposed within a radially extending groove defined in a distal portion of said axially extending portion.

19. The overrunning clutch assembly of claim 18, further comprising a thrust plate disposed between said first snap ring and said radially extending flange.

* * * * *